United States Patent

Sakura et al.

(10) Patent No.: US 7,699,733 B2
(45) Date of Patent: Apr. 20, 2010

(54) CHAIN TRANSMISSION DEVICE

(75) Inventors: Shunji Sakura, Osaka (JP); Akira Hirai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 56 days.

(21) Appl. No.: 11/999,221

(22) Filed: Dec. 4, 2007

(65) Prior Publication Data

US 2008/0171624 A1    Jul. 17, 2008

(30) Foreign Application Priority Data

Jan. 17, 2007    (JP) ............................. 2007-008391

(51) Int. Cl.
F16H 7/06    (2006.01)

(52) U.S. Cl. ....................... 474/161; 474/156

(58) Field of Classification Search ................ 474/152, 474/153, 155, 156, 161
See application file for complete search history.

(56) References Cited

U.S. PATENT DOCUMENTS 6,065,943 A * 5/2000 Suito et al. ................. 417/362

| | | | | |
|---|---|---|---|---|
| 2001/0045773 A1* | 11/2001 | Rutz et al. | ................. | 305/199 |
| 2004/0185977 A1* | 9/2004 | Young et al. | ................ | 474/202 |
| 2006/0058141 A1* | 3/2006 | Young | ........................ | 474/213 |

FOREIGN PATENT DOCUMENTS

| JP | 59-35765 | 3/1984 |
|---|---|---|
| JP | 09-264400 | 7/1997 |

OTHER PUBLICATIONS

U.S. Appl. No. 11/821,614, filed Jun. 25, 2007, Sakura et al.
U.S. Appl. No. 11/982,928, filed Nov. 06, 2007, Hiria et al.

* cited by examiner

Primary Examiner—Robert A Siconolfi
Assistant Examiner—Anna Momper
(74) Attorney, Agent, or Firm—Howson & Howson LLP

(57) ABSTRACT

In a chain transmission, vibration reduction is improved by an elastic member, sandwiched between an inner hub of a sprocket and a toothed outer circumferential member, in combination with a sprocket tooth configuration in which two or three different tooth form pitch angles are arranged irregularly along the sprocket's pitch circle.

1 Claim, 11 Drawing Sheets

CHAIN TRANSMISSION DEVICE

CROSS-REFERENCE TO RELATED APPLICATION

This application claims priority on the basis of Japanese application 2007-008391, filed Jan. 17, 2007. The disclosure of Japanese application 2007-008391 is hereby incorporated by reference.

FIELD OF THE INVENTION

This invention relates to improvements in chain transmissions for reducing vibration and noise generated when the rollers of a standard roller chain or the bushings of a standard rollerless bushing chain engage with sprocket teeth, and for effecting smooth disengagement of the rollers or bushings from the sprocket teeth.

BACKGROUND OF THE INVENTION

Chain transmissions, in which a chain is engaged with a driving sprocket and one or more driven sprockets, have been widely used as timing transmissions in automobile engines for driving valve-operating cam or cams from the engine crankshaft.

Recent demand for higher power automobile engines, coupled with public consciousness of environmental problems, has led to the development of engines that produce high levels of noise and vibration, and to efforts toward reduction of that noise and vibration. The principal source of timing transmission noise is the engagement sound generated as the chain engages the sprockets. Attempts have been made to reduce noise and vibration by utilizing vibration-proofing materials to absorb radiated sound. For example, as shown in FIG. 10, a sprocket 40 is provided with an annular elastic member 44 sandwiched between an inner circumferential member 46, which has a keyed hole 46a by which the sprocket is fixed to a shaft, and an outer circumferential member 42. on which the sprocket teeth are formed. Examples of sprockets having sandwiched elastic members are shown in Japanese Laid-Open Utility Model Publication No. Sho. 59-35765, and in Japanese Laid-Open Patent Publication No. Hei. 9-264400.

When the sprocket 40 engages with a standard roller chain 60, as shown in FIG. 11, and the sprocket rotates clockwise, a following roller 62 moves relative to the sprocket in an arc centered on the center O1 of a preceding roller 62, which has been seated on a tooth gap bottom. The arc has the chain pitch p as its radius. Accordingly, the following roller moves in its arcuate path relative to the sprocket, and collides with a tooth gap bottom, near the center thereof, substantially at a right angle. The kinetic energy of the roller is transmitted to the tooth gap bottom without being buffered at the beginning of engagement. As a result, a large engagement impact is transmitted to the sprocket shaft. The performance of the elastic member 44 in shutting out vibration has been found to be insufficient. Moreover, when excessive impact force is applied to the elastic member 44, the endurance of the elastic member 44 is reduced.

Since the chordal tooth form pitch pa of the sprocket 40 is equal to the pitch p of a standard roller chain 60, the respective following rollers 62 abut the teeth of the sprocket 40 at the same abutment position t, as shown in FIG. 11. The abutment position in each case is at the point intersection of a radial center line X and a tooth gap bottom. Therefore, the engagement of a roller or bushing always engages the sprocket 40 at the same engagement point, and vibration and noise having an order determined by the number of sprocket teeth are increased. The elastic member has been found to be incapable of reducing these noises and vibrations adequately.

The standard roller chain shown in FIG. 11 is a power-transmitting roller chain defined by the Japanese Industrial Standards (JIS) or by the International standards (ISO), and has a uniform chain pitch p (The distance between the centers O1 of the respective rollers 62). A standard bushing chain may be used in place of the standard roller chain 60. In such a case, the elements 62 in FIG. 11 can be regarded as bushings.

Accordingly, an object of the invention is to provide a chain transmission in which a roller of a standard roller chain, or a bushing of a standard bushing chain, engage with a sprocket tooth, in which the vibration-reducing performance of an elastic member incorporated into the sprocket is improved, and in which the endurance of the elastic member is improved

SUMMARY OF THE INVENTION

The chain transmission according to the invention comprises a sprocket having sprocket teeth, and a standard roller or bushing chain engaged with the sprocket teeth. The sprocket has a hub, an annular peripheral part on which the sprocket teeth are formed, and an annular elastic member disposed between, and concentric with, the hub and the annular peripheral part. The sprocket has a plurality of different tooth form pitch angles arranged irregularly along the circumferential direction of the sprocket's pitch circle.

In one preferred form of the chain transmission according to the invention, the form pitch angles are θ−Δθ, θ−Δθ and θ+2Δθ, θ being the tooth form pitch angle of a standard sprocket, and the tooth form pitch angles are arranged irregularly along the circumferential direction of the sprocket's pitch circle.

In another preferred form of the chain transmission according to the invention, the tooth form pitch angles are θ−Δθ, θ, and θ+Δθ, θ being the tooth form pitch angle of a standard sprocket, and the tooth form pitch angles are arranged irregularly along the circumferential direction of the sprocket's pitch circle.

Because the sprocket has a plurality of different tooth form pitch angles, and the tooth form pitch angles are arranged irregularly along the circumferential direction of the sprocket's pitch circle, the engagement impact between a roller or bushing and the tooth gap bottom of the sprocket is reduced, and the elastic member becomes more effective in vibration reduction. Furthermore, since the overall impact force applied to the elastic member is reduced, the endurance of the elastic member is improved.

The timing of engagement of a roller or bushing with the sprocket is also shifted. Consequently, vibrations and noises having an order determined by the number of sprocket teeth, which could not be effectively reduced by the elastic member alone, are reduced. Thus, the overall sounds produced by the chain transmission are significantly reduced by the combined effect of the shift in engagement timing and the vibration-reduction of the elastic member.

DETAILED DESCRIPTION OF THE PREFERRED EMBODIMENTS

In a chain transmission incorporating a standard roller chain or a standard rollerless bushing chain, if a sprocket has an annular elastic member concentrically sandwiched between a hub and an annular peripheral part on which the sprocket teeth are formed, and the sprocket has a plurality of different tooth form pitch angles, arranged irregularly along the circumferential direction of the sprocket's pitch circle, good vibration-reducing performance is exhibited, and vibration and noise having an order determined by the number of sprocket teeth are reduced, so that the overall sounds are significantly reduced. Moreover, the endurance of the elastic member is improved.

Figure 1:
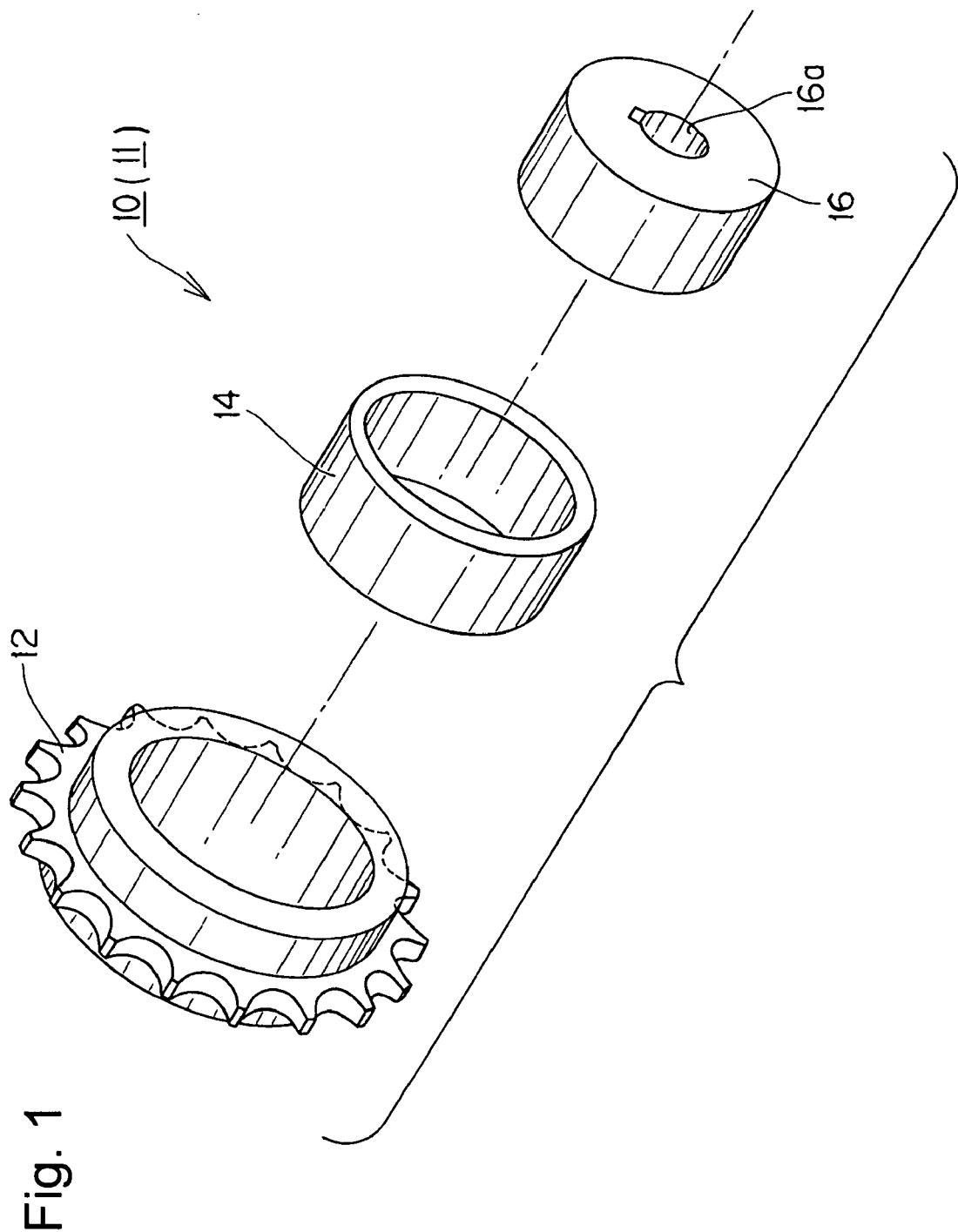
FIG. 1 is an exploded perspective view of a first embodiment of a sprocket according to the invention.
Figure 2A:
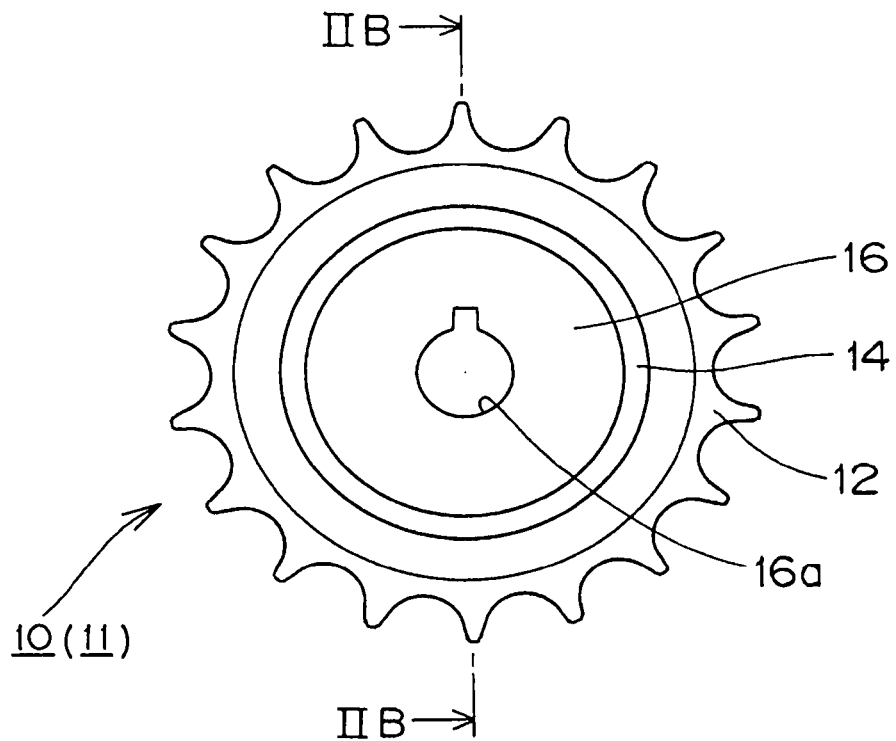
FIG. 2(a) is a front elevational view of the sprocket shown in FIG. 1.
Figure 2B:
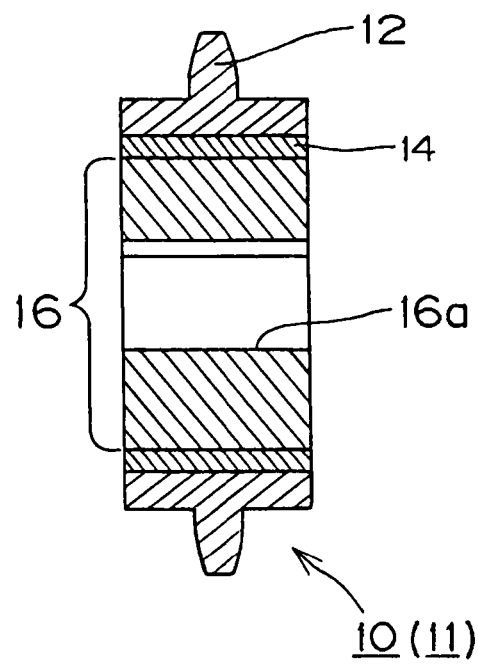
FIG. 2(b) is a cross-sectional view taken on section plane IIB-IIB in FIG. 2(a)
Figure 3:
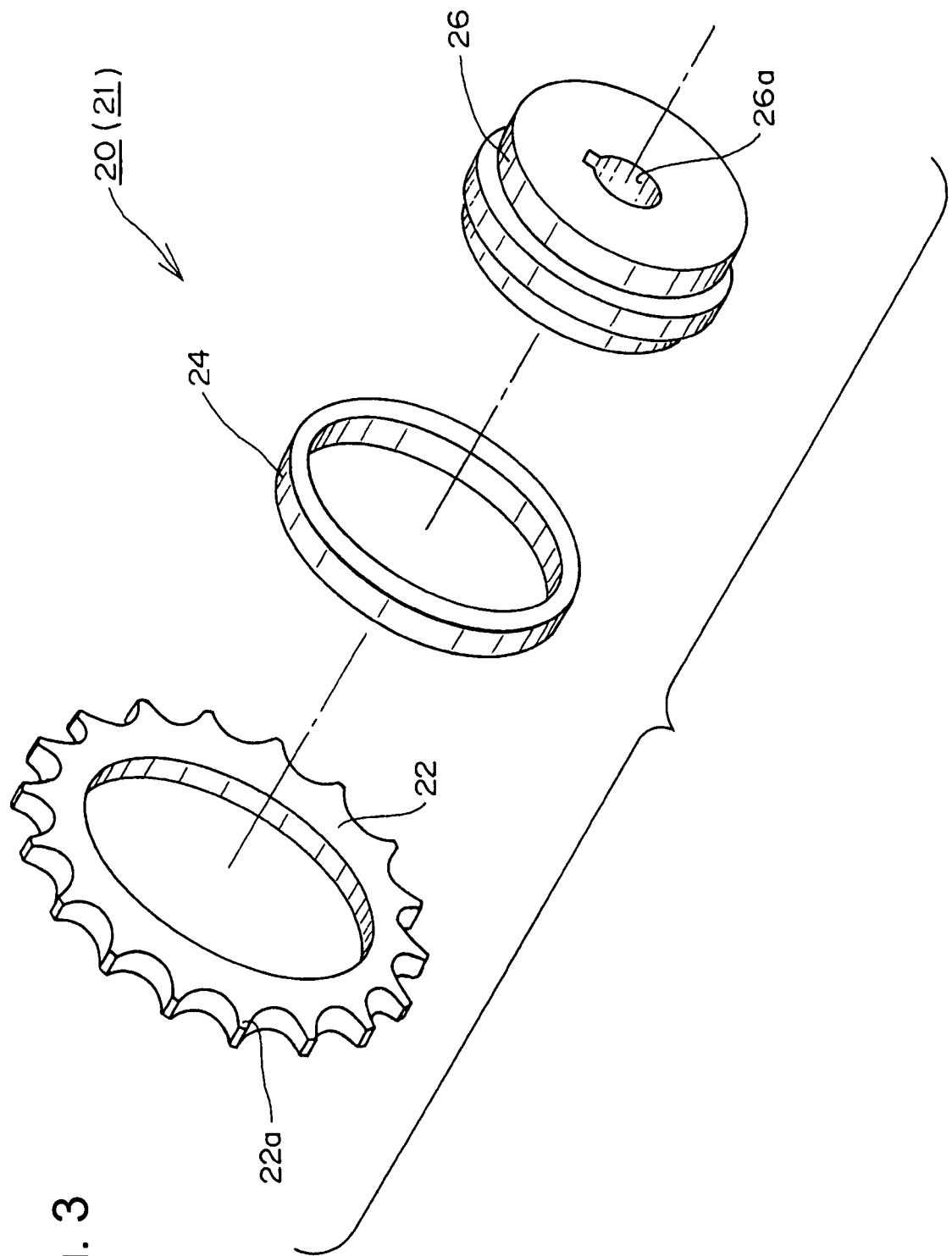
FIG. 3 an exploded perspective view of another embodiment of a sprocket according to the invention.
Figure 4A:
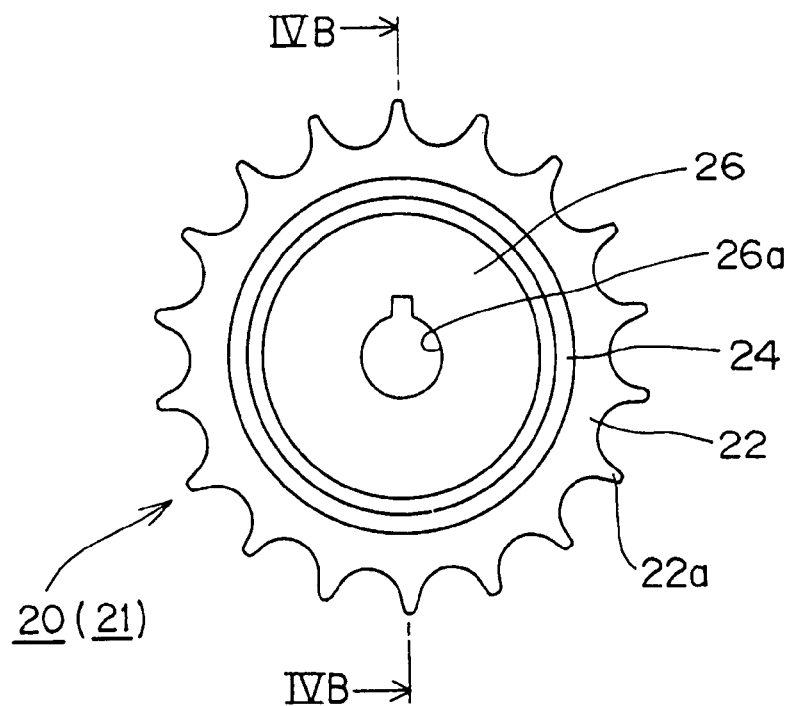
FIG. 4(a) is a front elevational view of the sprocket shown in FIG. 3.
Figure 4B:
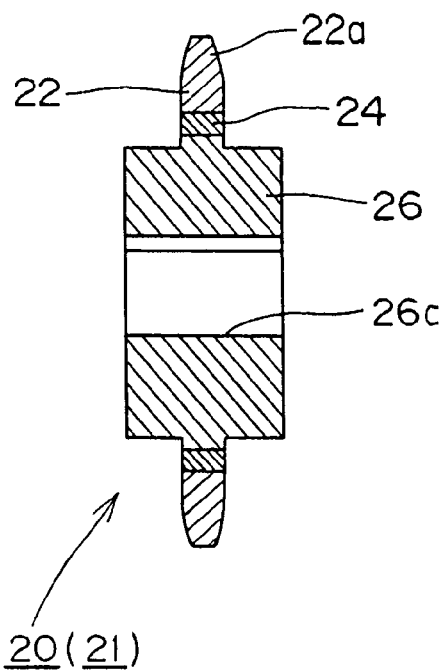
FIG. 4(b) is a cross-sectional view taken on section plane IVB-IVB in FIG. 4(a)

As shown in FIGS. 1, 2(a) and 2(b), in a first embodiment of the invention, an elastic member 14 is attached to an inner hub 16 of the sprocket. The hub includes a keyed shaft-receiving hole 16a, to which a shaft (not shown) can be fitted. An outer circumferential member 12, on which the sprocket teeth are formed, surrounds the elastic member 14. The elastic material can be resin, rubber, metal or the like, but the material of the elastic member should have a Young modulus smaller than that of the outer circumferential member 12.

The sprocket 10 can have two different tooth form pitch angles, $\theta-\Delta\theta$ and $\theta+2\Delta\theta$. The tooth form pitch angle $\theta-\Delta\theta$ is smaller than a standard pitch angle $\theta$ by an angle $\Delta\theta$, and a tooth form pitch angle $\theta+2\Delta\theta$ is larger than the standard pitch angle $\theta$ by two times the angle $\Delta\theta$. In order to allow engagement of the chain rollers with the sprocket teeth, $\Delta\theta$ must not be greater than ¼ the standard pitch angle $\theta$ (that is, $\Delta\theta \leq \theta/4$). Specifically, if the sprocket 10 has eighteen teeth, that is z=18, the standard pitch angle $\theta$ is 20°, from the expression $\theta=360°/z$, and $\Delta\theta \leq 5°$ based on the formula $\Delta\theta \leq \theta/4$.

In the sprocket, these two tooth form pitch angles, $\theta-\Delta\theta$ and $\theta+2\Delta\theta$, are arranged irregularly along the circumferential direction of the pitch circle, with two tooth form pitch angles $\theta-\Delta\theta$ for each tooth form pitch angle $\theta+2\Delta\theta$. A pair of pitch angles $\theta-\Delta\theta$, together with a single pitch angle $\theta+2\Delta\theta$, can be considered as one set of pitch angles. The sum of the pitch angles, $\theta-\Delta\theta$ and $\theta+2\Delta\theta$, in the sprocket is 360°.

Figure 8:
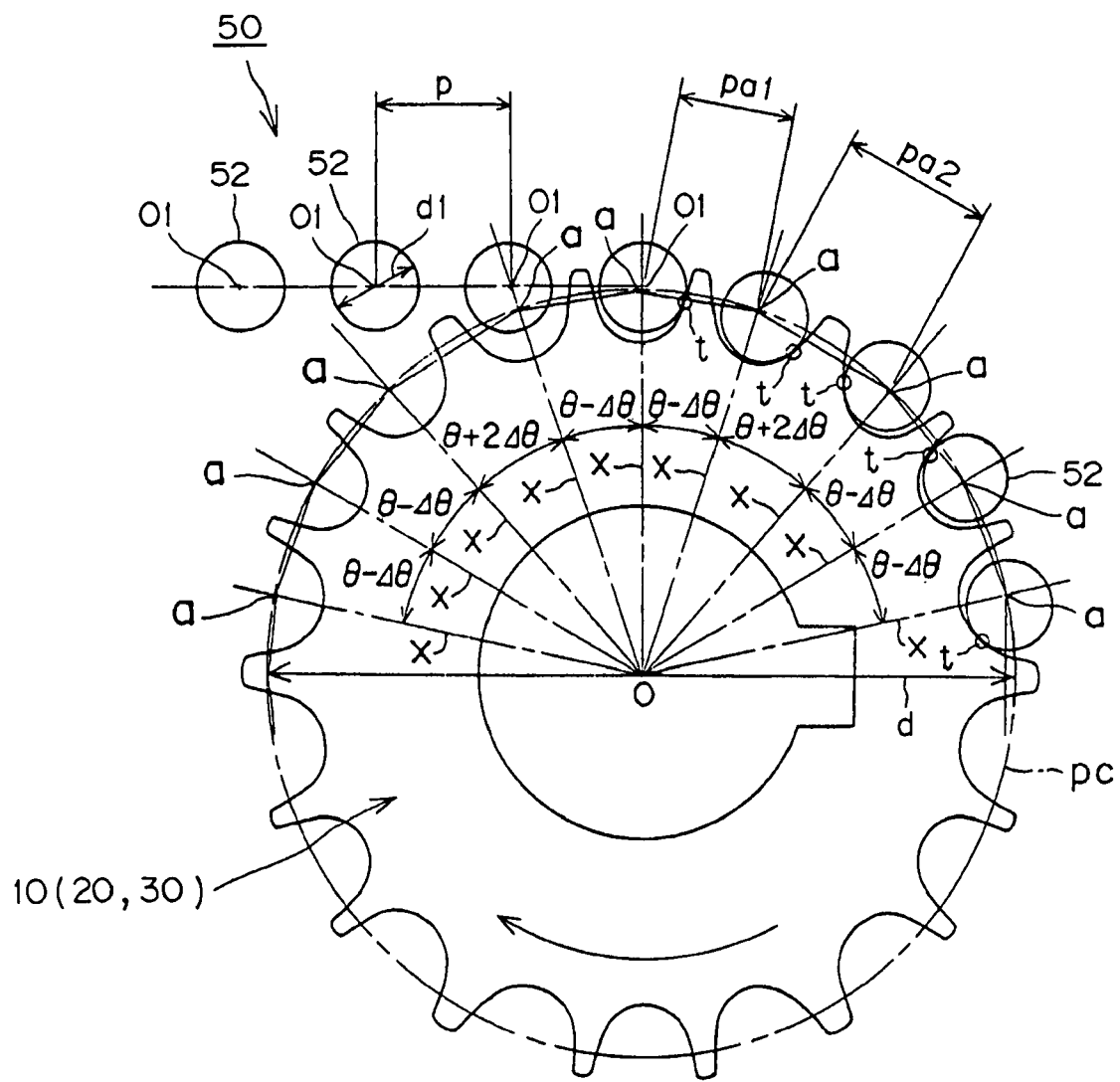
FIG. 8 is an elevational view showing the engagement of a standard roller chain and a sprocket in a chain transmission according to first, second and third embodiments of the invention.

FIG. 8 shows the engagement of a standard roller chain 50 and a sprocket 10 of the chain transmission device according to a first embodiment of the invention.

The standard roller chain 50 has a uniform chain pitch p, and the sprocket 10 has two different tooth form pitch angles, $\theta-\Delta\theta$ and $\theta+2\Delta\theta$. These tooth form pitch angles, $\theta-\Delta\theta$ and $\theta+2\Delta\theta$, are arranged irregularly along the circumferential direction of the pitch circle pc, with two pitch angles $\theta-\Delta\theta$ and one pitch angle $\theta+2\Delta\theta$ constituting a set. As the chain approaches the rotating sprocket 10, a roller 52, following a preceding roller already seated, moves relative to the preceding roller about the center O1 of the preceding roller, in an arc having the chain pitch p as its radius. The roller abuts a tooth gap bottom or a tooth surface at an abutment position t shown by a small circle in FIG. 8. The abutment position varies depending on the arrangement of the tooth form pitch angles. Moreover, since a roller 52 abuts the sprocket from a direction substantially tangential to a tooth surface, the kinetic energy of the roller 52 is buffered, and abutment shock and engagement noise are reduced. At the same time, the vibration reducing performance of the elastic member is improved.

The standard roller chain 50 has a uniform chain pitch p, but the sprocket 10 has two kinds of tooth form pitches pa1 and pa2, which are chordal distances corresponding to the two different tooth form pitch angles. Since the tooth form pitches pa1 and pa2 are arranged irregularly along the circumferential direction of the pitch circle pc with two tooth form pitches pa1 and one tooth form pitch pa2 constituting a set, the abutment position t of each roller 52 onto a tooth of the sprocket 10 at the beginning of engagement changes as shown in FIG. 8. Thus, there is a shift in the timing of the collision of each following roller 52 with a sprocket tooth. As a result, vibration and noise, having an order determined by the number of teeth, are reduced even though they could not be adequately reduced by the use of the elastic member alone.

A chain transmission according to a second embodiment of the invention will now be described with reference to FIGS. 3, 4(a), 4(b), and 8. As apparent from FIGS. 3, 4(a) and 4(b), an elastic member 24 is attached to an outer circumferential member 22, on which teeth 22a are formed for engagement with the rollers or bushings of a chain. The elastic member 24 is composed of a material having a Young's modulus smaller than that of the outer circumferential member 22.

As in the case of the sprocket 10 of FIGS. 1, 2(a) and 2(b), the sprocket 20 has two different tooth form pitch angles $\theta-\Delta\theta$ and $\theta+2\Delta\theta$, as shown in FIG. 8. Since the tooth form pitch angles are arranged irregularly along the circumferential direction of the sprocket's pitch circle, the sprocket's vibration-reducing performance and the endurance of the elastic member are improved, and, at the same time, vibration and noise having an order determined by the number of sprocket teeth, are reduced even though they could not be effectively reduced by the elastic member alone.

Figure 5:
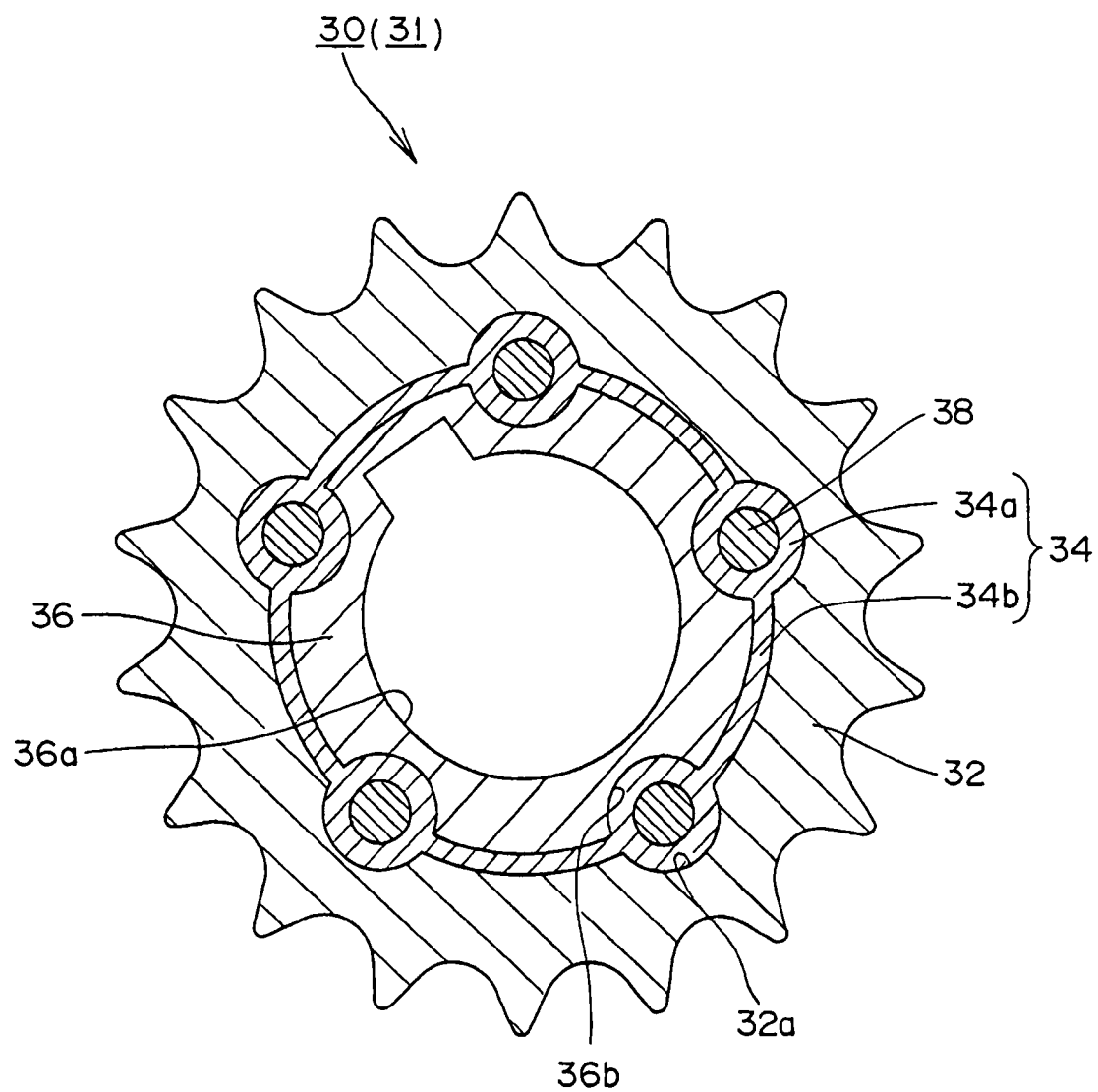
FIG. 5 is cross-sectional view of a sprocket according to still another embodiment of the invention.
Figure 6:
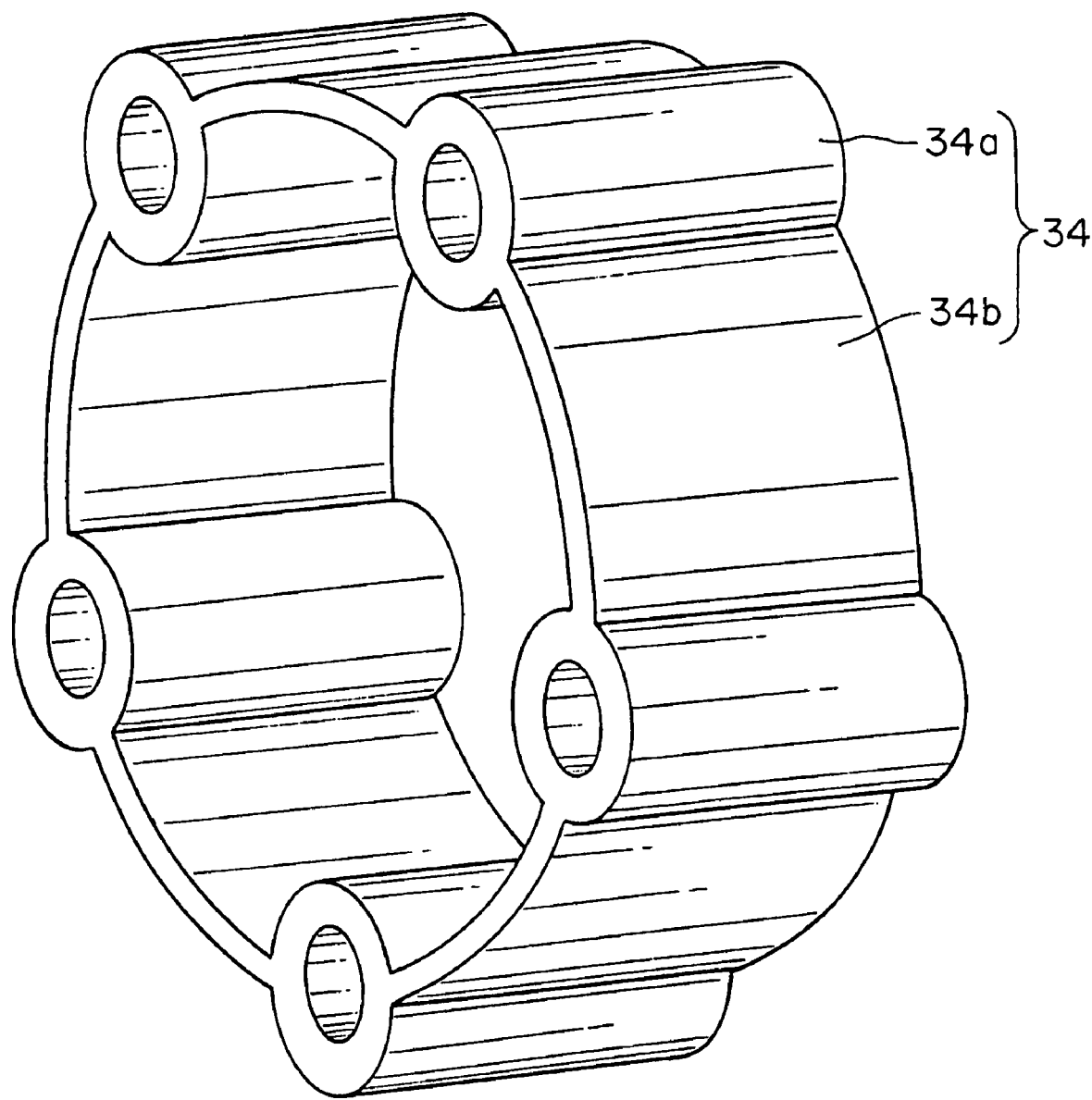
FIG. 6 is a perspective view of an elastic member in the sprocket shown in FIG. 5.

In the sprocket of a chain transmission according to a third embodiment of the invention, as shown in FIGS. 5 and 6, an elastic member 34 is sandwiched between an inner circumferential hub 36 and an outer circumferential member 32 on which sprocket teeth are formed. The hub has a keyed shaft hole 36a to which a shaft can be fitted. The elastic member 34 is composed of a material such as resin, rubber, metal, or the like, having a Young's modulus lower than that of the outer circumferential member 32.

The elastic member 34 is formed with a plurality of spaced cylindrical portions 34a, disposed at equal intervals around the circumference of the elastic member. The cylindrical members are connected by arc-shaped plates 34b. The elastic member 34 is sandwiched between the outer circumferential surface of the hub 36, and an inner circumferential surface of the toothed outer circumferential member 32. The cylindrical portions 34a are fitted between opposed concave grooves 36b and 32a, respectively disposed on the outer circumferential surface of the hub 36 and the inner circumferential surface of the member 32 at uniform intervals. Center pins 38 are fitted into, and secured to, hollow central openings in the cylindrical portions 34a of the elastic members. The pins 38 are preferably formed of a material having a higher rigidity than that of the elastic member 34.

Since the cylindrical portions 34a of the elastic member are disposed at equal intervals in the circumferential direction, the outer circumferential member 32 and the hub 36 are prevented from sliding circumferentially relative to the elastic member 34, and from rotating relative to each other. Thus, the elastic member is prevented from being sheared by relative rotation of the inner circumferential surface of the outer circumferential member 32 and the outer circumferential surface of the hub 36 of the sprocket 30.

The sprocket 30 has two different tooth form pitch angles, $\theta-\Delta\theta$ and $\theta+2\Delta\theta$, as shown in FIG. 8. Since the tooth form pitch angles are arranged irregularly along the circumferential direction of the sprocket's pitch circle, the vibration-reducing performance of the elastic member is improved, and, at the same time, vibration and noise having an order determined by the number of sprocket teeth, which could not be effectively reduced by the elastic member 34 alone, are reduced.

A chain transmission device according to a fourth embodiment of the invention will be described with reference to FIGS. 1, 2(a), 2(b) and 9.

Figure 9:
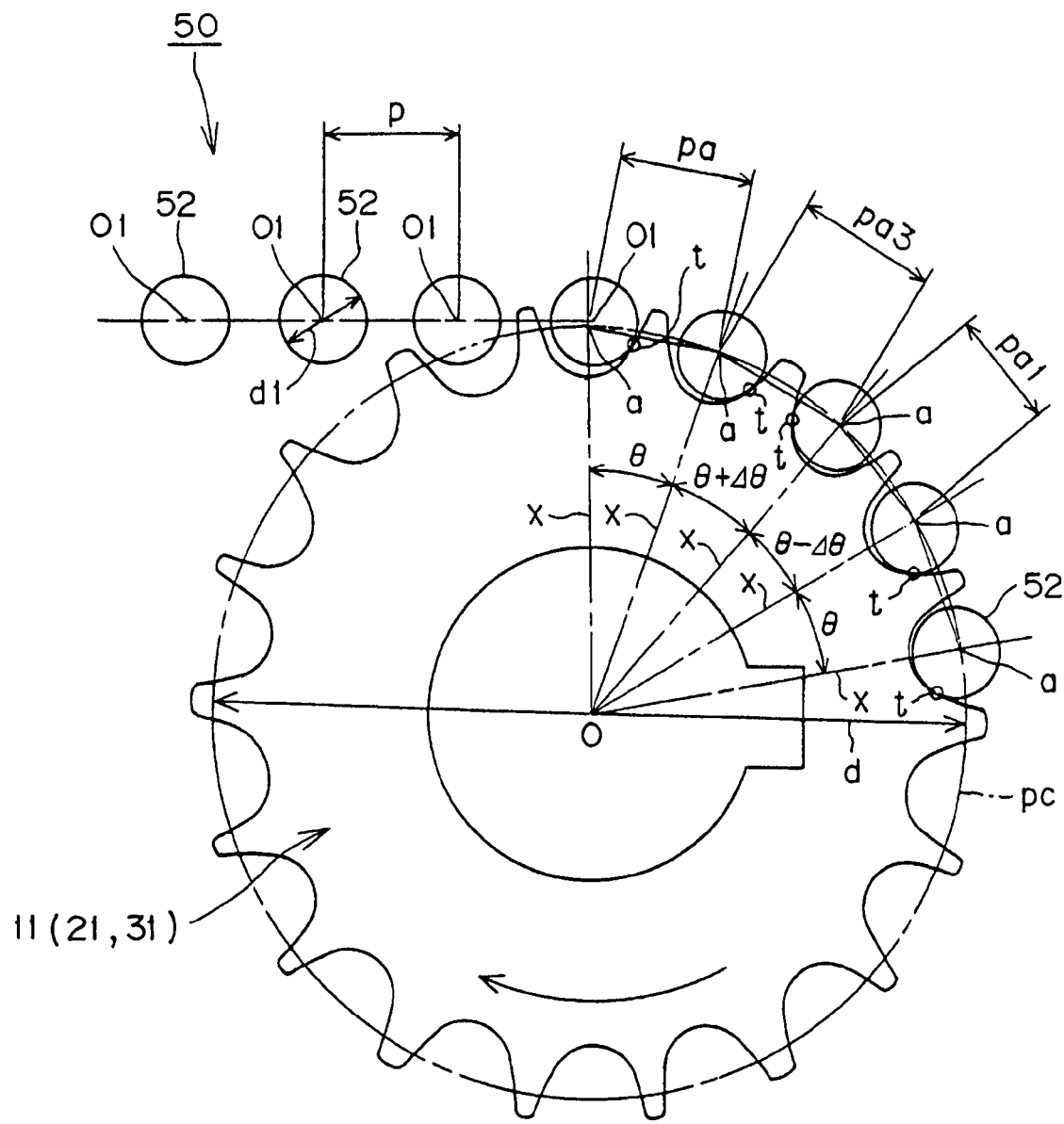
FIG. 9 is an elevational view showing the engagement of a standard roller chain and a sprocket in a chain transmission according to fourth, fifth and sixth embodiments of the invention.
Figure 10:
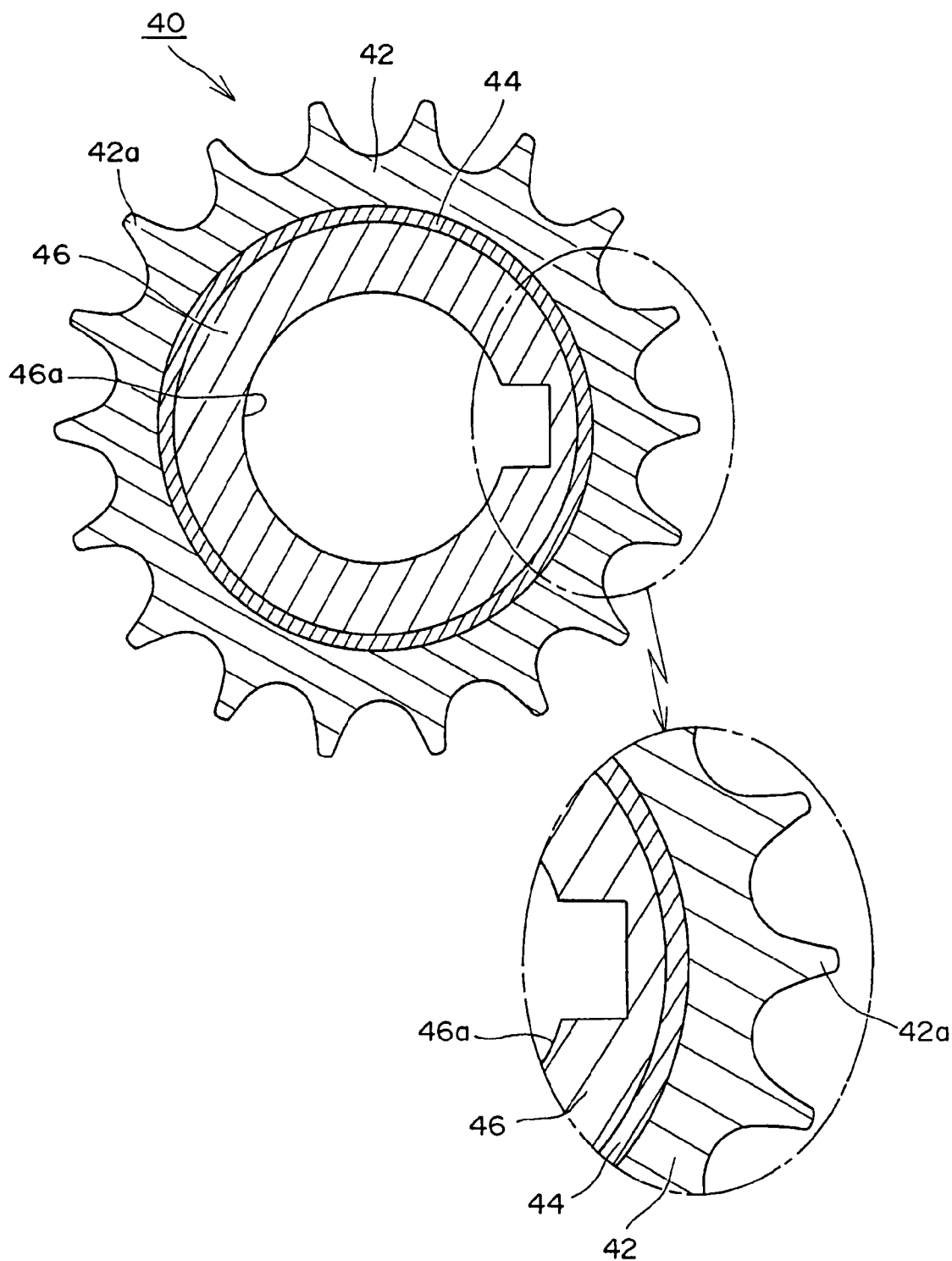
FIG. 10 is a schematic elevational view of a conventional sprocket having a vibration-reducing elastic member, including an enlarged auxiliary view.
Figure 11:
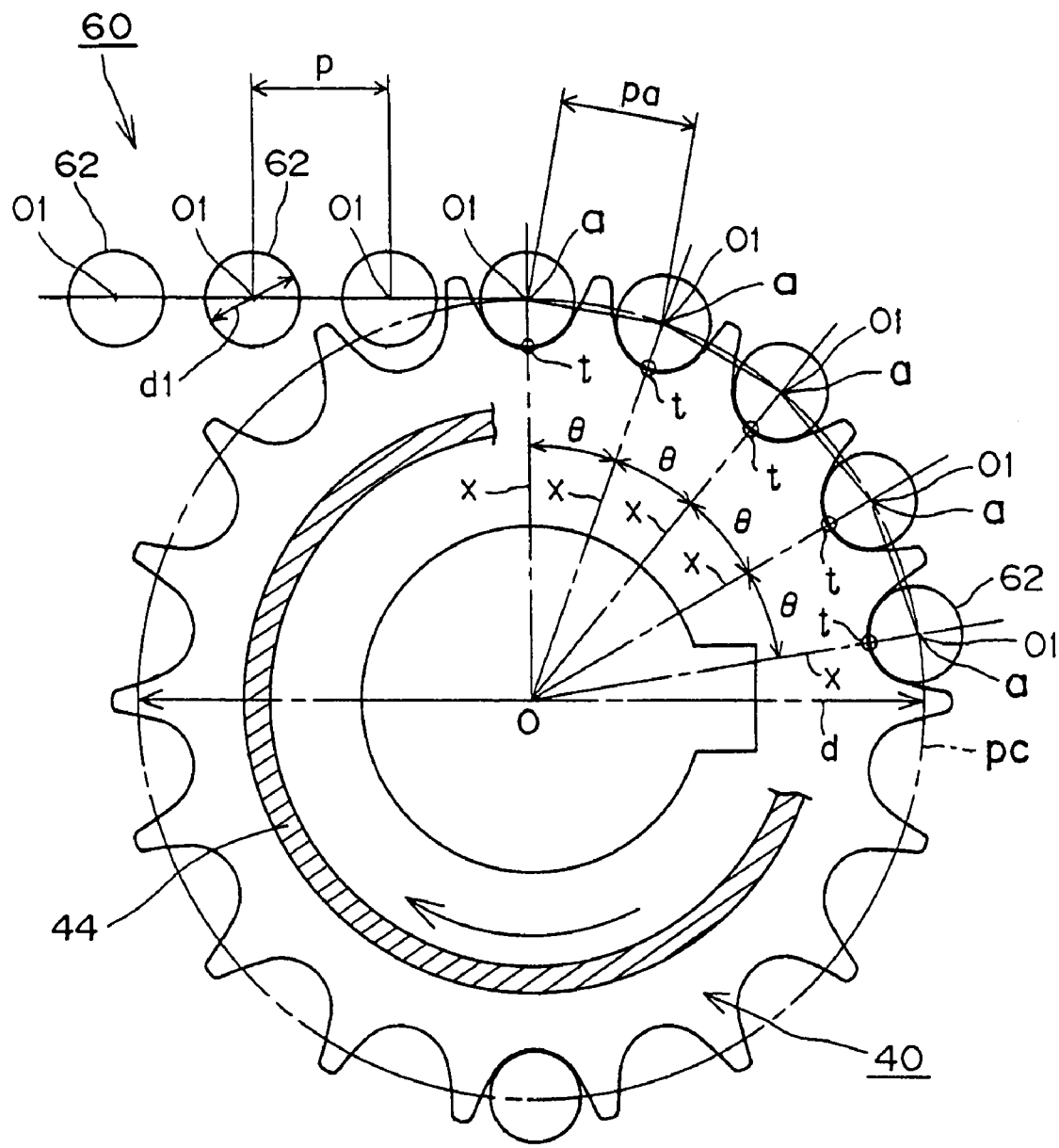
FIG. 11 is an elevational view showing a conventional chain transmission using a standard roller chain and a standard sprocket.

The sprocket 11, which is shown in FIGS. 2(a) and 2(b), is similar to the sprocket of the first embodiment, insofar as its general configuration, its function, and its materials are concerned. However, as shown in FIG. 9, the sprocket of the fourth embodiment has three different tooth form pitch angles, $\theta$, $\theta+\Delta\theta$, and $\theta-\Delta\theta$, where $\theta$ is a standard pitch angle corresponding to 360° divided by the number of z of sprocket teeth, i.e., 360°/z. Thus, the tooth form pitch angle $\theta+\Delta\theta$ is larger than a standard pitch angle $\theta$ by an angle $\Delta\theta$, and a tooth form pitch angle $\theta-\Delta\theta$ is smaller than the standard pitch angle $\theta$ by an angle $\Delta\theta$. $\Delta\theta$ must be ¼ or less the standard pitch angle $\theta$ (that is, $\Delta\theta \leq \theta/4$) in order to allow engagement of the sprocket with the roller 52. Specifically, if the sprocket 11 is a driving sprocket having eighteen teeth, the standard pitch angle $\theta$ is 20°, from the expression $\theta=360°/z$, and $\Delta\theta \leq 5°$, from the expression $\Delta\theta \leq \theta/4$. The total of three tooth pitch angles $\theta$, $\theta+\Delta\theta$, and $\theta-\Delta\theta$, is 360°.

In the sprocket shown in FIG. 9, these three tooth form pitch angles $\theta$, $\theta+\Delta\theta$ and $\theta-\Delta\theta$, which constitute a set, are present in the sprocket in equal numbers, and are arranged irregularly along the circumferential direction of the pitch circle pc. Here, as in the previously described embodiments, the tooth form pitch pa is a chordal distance corresponding to the standard tooth pitch angle $\theta$. Tooth form pitch pa3 is a chordal distance corresponding to a tooth form pitch angle $\theta+\Delta\theta$, and tooth form pitch pa1 is a chordal distance corresponding to a tooth form pitch angle $\theta-\Delta\theta$. Therefore, the sprocket 11b has three different tooth form pitches, pa, pa3 and pa1, arranged irregularly along the circumferential direction of the pitch circle pc.

As shown in FIG. 9, the engagement between the standard roller chain 50 and the sprocket 11 according to the fourth embodiment of the invention takes place as follows. As the sprocket 11 rotates clockwise in FIG. 9, the chain approaches the sprocket, and a roller 52, following a preceding roller already seated, moves relative to the preceding roller about the center O1 of the preceding roller, in an arc having the chain pitch p as its radius. The roller abuts a tooth gap bottom or a tooth surface at an abutment position t shown by a small circle in FIG. 9. The abutment position varies depending on the arrangement of the tooth form pitch angles. Moreover, since a roller 52 abuts the sprocket from a direction substantially tangential to a tooth surface, the kinetic energy of the roller 52 is buffered, and abutment shock and engagement noise are reduced. At the same time, the vibration-reducing performance of the elastic member is improved.

Since the standard roller chain 50 of the fourth embodiment has a uniform chain pitch p, and the sprocket 11 has three different tooth form pitches, pa, pa3, and pa1, which together form a set, the abutment position t of each roller 52 varies. Therefore, the timing of the collision of each roller with the sprocket teeth is shifted, and, as a result, vibration and noise having an order determined by the number of teeth are reduced even when they cannot be effectively reduced by the elastic member alone.

A fifth embodiment of the invention will be described with reference to FIGS. 3, 4(a), 4(b), and 9.

The elastic member of the sprocket 21 of the fifth embodiment, and its function and its material, are the same as the elastic member 24 of the second embodiment described above.

Here, as in the fourth embodiment, the sprocket has three kinds of different tooth form pitch angles: $\theta$ $\theta+\Delta\theta$, and $\theta-\Delta\theta$, as shown in FIG. 9. Since the tooth form pitch angles are arranged irregularly along the circumferential direction of the pitch circle, the vibration-reducing performance of the elastic member 24 is improved, and, at the same time, vibration and noise having an order determined by the number of sprocket teeth are reduced even when they cannot be effectively reduced by the elastic member 24 alone. Other details of the fifth embodiment are the same as those of the second embodiment.

In a sixth embodiment of the invention, which will be described with reference to FIGS. 5, 6, and 9, the shape of the elastic member, its function, and its material, are the same as those of the elastic member 34 of the third embodiment described above.

The sprocket has three different tooth form pitch angles: $\theta$, $\theta+\Delta\theta$ and $\theta-\Delta\theta$, as shown in FIG. 9. The tooth form pitch angles are arranged irregularly along the circumferential direction of the sprocket's pitch circle. The vibration-reducing performance of the elastic member 24 is improved, and, at the same time, vibration and noise having order determined by the number of sprocket teeth are reduced even though they could not be effectively reduced by the elastic member 34 alone.

In the first, second, fourth and fifth embodiments, the elastic members 14 and 24 are of a cylindrical shape with a uniform thickness, and the tooth form pitch angles of the sprocket are arranged irregularly along the circumferential direction of the sprocket's pitch circle. The magnitude of the impact generated on engagement varies, and the absorption of impact and the vibration-reducing performance of the sprocket can be increased by increasing the thickness of the elastic member.

In all of the examples described above, the elastic members 12, 24, and 34 are attached to the outer circumferential members 12, 22, 32 and the hubs or inner circumferential members 16, 26, 36, or the elastic members are sandwiched between the outer and inner circumferential members.

Figure 7:
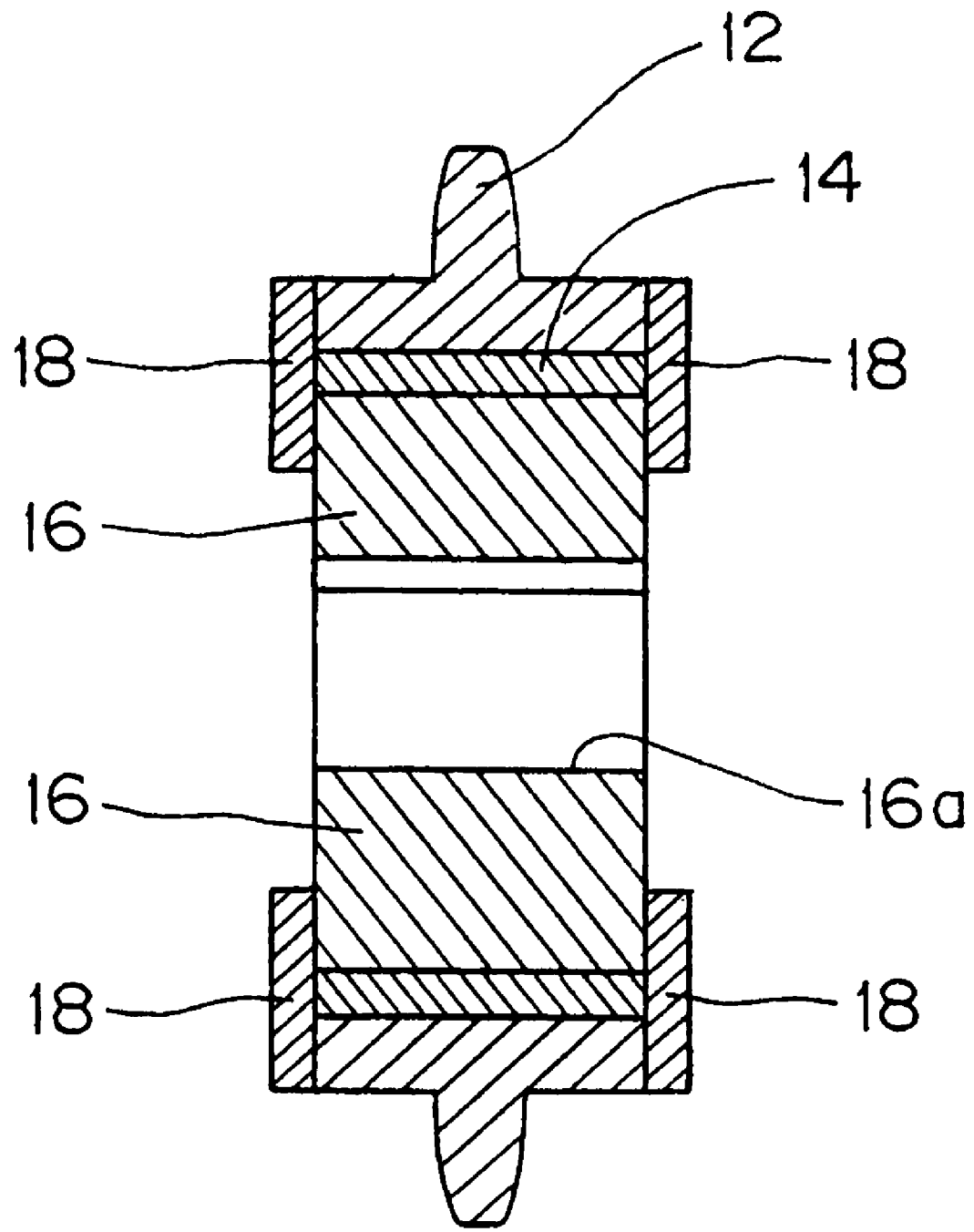
FIG. 7 is a cross-sectional view of a sprocket similar to the sprocket of FIGS. 1, 2(a) and 2(b), but having attached ring members.

As shown in FIG. 7, ring members 18 can be provided on both sides of the elastic member 14, to prevent loss of sprocket teeth in the event of breakage of the elastic member of the sprocket.

INDUSTRIAL APPLICABILITY

In the chain transmission of the invention, the vibration-reducing performance of the sandwiched elastic member is increased, the endurance of the elastic member is improved, and vibrations and noises, having an order determined by the number of sprocket teeth, are reduced so that overall sounds are significantly reduced, and the vibration-reducing performance of the sprocket's elastic member is more fully realized.

What is claimed is:

1. A chain transmission comprising:
   a sprocket having sprocket teeth; and
   a roller or bushing chain engaged with the sprocket teeth, the chain having a uniform chain pitch;
   wherein the sprocket has a hub having an outer circumferential surface, an annular peripheral part on which the sprocket teeth are formed, said annular peripheral part having an inner circumferential surface, and an annular elastic member sandwiched between, and concentric with, the hub and the annular peripheral part;
   wherein the elastic member is formed with a plurality of circumferentially spaced cylindrical portions and said cylindrical portions are connected by arc-shaped parts and fit into opposed concave grooves formed in the outer circumferential surface of the hub and the inner circumferential surface of the annular peripheral part;
   wherein the sprocket has a plurality of different tooth form pitch angles, and said tooth form pitch angles are arranged irregularly along the circumferential direction of the sprocket's pitch circle;
   wherein each of said circumferentially spaced cylindrical portions is formed with a hollow central opening; and
   wherein a pin, formed of a material having a higher rigidity than that of the elastic member is fitted into each said hollow central opening.

* * * * *